United States Patent Office 3,207,656
Patented Sept. 21, 1965

3,207,656
PAPER PRODUCTS CONTAINING
SULFINE POLYMERS
Nelson R. Eldred, South Charleston, and George W. Buttrick and John C. Spicer, Charleston, W. Va., assignors to Union Carbide Corporation, a corporation of New York
No Drawing. Filed Dec. 26, 1962, Ser. No. 247,355
16 Claims. (Cl. 162—168)

The present invention relates to the production of paper products from conventional cellulosic paper-making fibers. More particularly, the invention is concerned with the incorporation in such paper products of certain high molecular weight polymers whereby the physical properties of the paper products are materially improved. Specifically, this invention depends upon the finding that paper products evidencing a high degree of dry- and wet-strength, improved filler retention, and other desirable physical properties, are obtained by applying to the paper pulp or paper, at some time during the production of the paper up to and including the finished paper, an aqueous medium containing at least one substantially water-soluble sulfine polymer, certain of which polymers constitute novel compositions of matter. The invention further comprehends the improved paper products produced in this manner.

It is known that conventional cellulosic paper products, particularly when wetter, ordinarily lose their strength rapidly, and are, for instance, easily torn. To improve the physical properties of paper in this regard, it has become common practice to treat the paper with a water-soluble nitrogen-containing resin, such as a urea- or melamine formaldehyde resin, that can be subsequently acid-cured to insolubilize the resin. While some improvement in the strength of the paper can be realized in this manner, the use of urea- or melamine-formaldehyde resins is not entirely satisfactory in that it ordinarily requires accelerated heat-curing or ageing at room temperature for prolonged periods of time in the presence of an acidic curing agent in order to develop a high degree of strength in the paper. Moreover, the strength developed through the use of urea- and melamine-formaldehyde resins is frequently temporary or lost after exposure to water. This latter phenomenon, it is believed, is due at least in part to the fact that the acid-cured resin is readily hydrolyzed, especially in the presence of acidic materials such as the acidic curing agents which normally remain in the resin. In addition, paper treated with urea- or melamine-formaldehyde resins often develops a harsh "hand" or feeling, or does not have the desired dimensional stability, fold endurance, tear strength or bursting strength desired for certain applications.

Many similar disadvantages are also encountered when other conventional treating agents, such as glue and starch sizes, are instead applied in an attempt to improve the physical properties of paper products. Furthermore, such treating agents also require extensive cooking in water to effect their solution prior to use, and necessitate the additional incorporation of a preservative in order to minimize their bacterial degradation.

Another serious difficulty encountered in the production of paper concerns filler retention. In conventional systems, at a single pass, only about 30 percent by weight of the filler incorporated in the paper-making furnish is retained in the final sheet. When the water and other materials which drain through the forming screen or wire at the time the sheet is formed are recirculated (a closed system), it is possible to retain up to 70 to 90 percent by weight of the filler added to the furnish, particularly when a low concentration of filler based upon the weight of paper (fibers) is employed. Filler retention, however, provides a more difficult problem when 15 to 20 percent by weight or more of the filler based upon the weight of paper is to be retained in the finished sheet. Under such circumstances, it is necessary to recirculate and carry a large quantity of suspended filler in the system. However, such large quantity of suspended filler often interferes with satisfactory paper formation, causing streaks in the finished paper, and upon discharge into the waste stream may cause pollution as well as engender an uneconomical operation.

It has now been found that the disadvantages of the prior art as hereinabove described can be overcome to a significant extent through the practice of the present invention which, in important part, comprises applying to the paper pulp in the "wet-end" stage or to the finished paper an aqueous medium containing at least one high-molecular weight, normally solid and substantially water-soluble polymer of an alpha-ethylenically unsaturated sulfine, i.e., a sulfonium compound possessing a terminal ethylenic unsaturation. More particularly, the polymers contemplated by this invention as treating agents for paper products include the homopolymers of the alpha-ethylenically unsaturated sulfines represented by the formula:

I 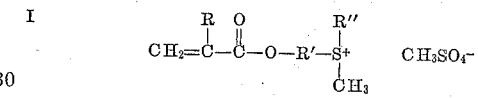

wherein R designates either a hydrogen atom or a methyl radical; R' designates an alkylene radical containing from 1 to about 4 carbon atoms and preferably from 2 to 3 carbon atoms, such radical more preferably separating the adjacent (in this instance oxygen and sulfur) atoms by a carbon chain containing at least 2 carbon atoms; and R" designates a lower alkyl radical containing from 1 to about 4 carbon atoms and preferably from 1 to 2 carbon atoms. As illustrative of such ethylenically unsaturated sulfines, there can be mentioned: acryloxymethyl-dimethylsulfonium methyl sulfate, (2-acryloxyethyl)dimethylsulfonium methylsulfate, (2 - acryloxyethyl)methylethylsulfonium methylsulfate, (2-acryloxyethyl)methylbutylsulfonium methylsulfate, (4-acryloxybutyl)dimethylsulfonium methylsulfate, (2-methacryloxyethyl)dimethylsulfonium methylsulfate, and the like.

The polymeric treating agents of this invention also include interpolymers (i.e., copolymers, terpolymers and quadripolymers, etc.) of the aforementioned sulfines, especially with at least one other copolymerizable monomer as, for instance, the alkylthioalkyl acrylates and methacrylates represented by the formula:

II 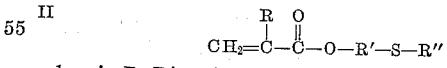

wherein R, R' and R" are as defined above, such as methylthiomethyl acrylate, methylthioethyl acrylate, ethylthioethyl acrylate, butylthioethyl acrylate, methylthiobutyl acrylate, methylthioethyl methacrylate, and the like; acrylamide and lower alkyl substituted acrylamides, such as methacrylamide and N,N-dimethylacrylamide; the vinylbenzenes, including vinylbenzene and lower alkyl substituted vinylbenzenes, the alkyl and cyanoalkyl acrylates and methacrylates represented by the formula:

III 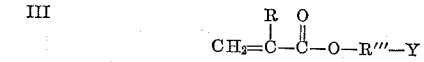

wherein R is as defined above, R''' designates an alkylene radical containing from 1 to about 10 carbon atoms and preferably from 1 to 4 carbon atoms, and Y designates either a hydrogen atom or a cyano (—CN) radical, such as methyl acrylate, ethyl acrylate, butyl acrylate, 2-ethylhexyl acrylate, methyl methacrylate, 2-cyanoethyl acrylate, and the like; the vinyl alkanoates represented by the formula:

IV 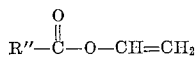

wherein R'' is as defined above, such as vinyl acetate, vinyl propionate, vinyl butyrate, vinyl pentanoate, and the like: the N-alkyl-N-vinylamides represented by the formula:

V 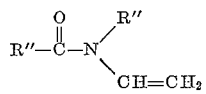

wherein each R'' is independently selected as defined above, such as N-methyl-N-vinylacetamide, N-ethyl-N-vinylacetamide, N-butyl-N-vinylacetamide, N-methyl-N-vinylpropionamide, and the like; and the N-vinylpyrrolidones, such as N-vinyl-2-pyrrolidone; the amount of polymerized sulfine in the interpolymers being sufficient to assure the substantial and preferably complete water solubility of the interpolymers. Found to be particularly effective in this regard, are the interpolymers containing at least 5 mole percent, preferably from about 10 mole percent to about 99 mole percent and more preferably from about 25 mole percent to about 80 mole percent of the sulfine in polymerized form on a theoretical monomer basis, the minimal amount of polymerized sulfine required to assure the water solubility of the interpolymers varying somewhat depending upon the particular comonomer(s) polymerized therewith.

Advantageously, upon drying at room temperature, or preferably at a moderately elevated temperature for a short period of time, the treated paper products of this invention evidence a high, and substantially permanent degree of dry- and wet-strength, and in this respect, as well as in other physical properties, are often superior to many commercial paper products. Moreover, accelerated heat-curing or ageing for prolonged periods of time, as is ordinarily required in connection with the use of cationic urea- and melamine-formaldehyde resins, is not necessary to develop a satisfactory degree of dry- and wet-strength in the improved paper products of this invention, since such physical properties rapidly develop upon drying, or preferably upon heating at a moderately elevated temperature for a short period of time. In addition, unlike urea- and melamine-formaldehyde resin-treated papers which require heat-curing or ageing in an acidic environment to develop strength, the improved paper products of this invention can be prepared in the absence of a curing agent, and in a neutral or somewhat alkaline environment, if desired. Still another advantage of this invention lies in the fact that the polymers employed as treating agents in accordance with this invention have been found more effective at lower concentrations insofar as an improvement in dry- and wet-strength is concerned, as compared with many conventional treating agents. Thus, this invention also provides a more convenient and economical process for the production of improved paper products. Further, when employed at the "wet-end" stage of papermaking, the polymeric treating agents of this invention engender a materially enhanced degree of filler retention whenever conventional fillers are also employed.

The polymeric treating agents of this invention can be produced by several different techniques. For instance, the alpha-ethylenically unsaturated sulfine represented above by Formula I can be obtained initially in monomeric form and subsequently polymerized by conventional processes for the polymerization of alpha-ethylenically unsaturated compounds either alone, so as to produce homopolymers thereof, or together with one or more comonomers hereinabove described, so as to produce interpolymers thereof. When desired initially in monomeric form, the sulfine can readily be obtained by reacting the corresponding alkylthioalkyl acrylate or methacrylate represented above by Formula II with an alkylating agent, viz., dimethyl sulfate. Reactions between a thio-ether and an alkylating agent are in general discussed, for instance, in "Organic Chemistry," vol. I, 2nd ed., by H. Gilman, John Wiley and Sons, New York (1948), page 867, such teachings being incorporated herein by reference. Concordant therewith, by way of illustration, the alkylation can be carried out by bringing the thio-ether and the alkylating agent into reactive admixture, in a suitable solvent or diluent if desired, and at a temperature of from about 25° C. or slightly lower, up to about 90° C. to 100° C., or slightly higher. In addition, a small amount of a conventional polymerization inhibitor, such as hydroquinone, or the like, is preferably incorporated in the reaction mixture. Moreover, the reaction is preferably carried out in a diluent which is a solvent for the thio-ether but a non-solvent for the resulting sulfine, such as benzene, isopropyl ether, etc. The sulfine product can then be separated and recovered in any convenient manner.

The polymeric treating agents of this invention can thereafter be obtained by conventional polymerization processes. Thus, for example, solution polymerization techniques can be utilized wherein an inert organic solvent solution of the sulfine alone, or in admixture with one or more comonomers, in proportions as hereinabove described, is contacted with a catalytic amount of a polymerization catalyst and maintained at a temperature at which polymerization will occur for a period of time sufficient to produce a polymer product. A particularly useful solvent which can be utilized in this connection is acetonitrile, although any other suitable inert organic solvent, such as acetone, N,N-dimethylformamide, dimethylsulfone, N,N-dimethylacetamide, ethylene carbonate, ethylene carbamate, gamma-butyrolacetone, N-methyl-2-pyrrolidone, etc., can also be employed. Alternatively, bulk, suspension or emulsion polymerization techniques can also be used under otherwise similar reaction conditions, i.e., proportions, temperature, time, etc. Similarly, other diluents such as water, benzene, toluene, xylene, hexane, heptane, etc., can also be used.

The catalysts most frequently employed in the polymerization reactions, and especially in connection with solution polymerization techniques, are the free-radical-type polymerization catalysts, such as the azo compounds, of which azo-2,2'-diisobutyronitrile, dimethyl azo-2,2'-diisobutyrate, azo-2,2'-bis(2,4-dimethylvaleronitrile), azo-2,2'-diisobutyramide, and the like, are typical. Other free-radical-type polymerization catalysts which can be employed are the peroxides, such as hydrogen peroxide, acetyl peroxide, benzoyl peroxide, peracetic acid, potassium persulfate, calcium percarbonate, etc. The catalyst is ordinarily incorporated in the polymerization reaction mixture in a concentration of from about 0.01 percent to about 5 percent or more by weight, and preferably from about 0.2 to about 2 percent by weight, based upon the total weight of monomer present, although any catalytic amount thereof can be utilized.

In general, the polymerization is carried out by contacting the monomers with the catalyst at a temperature of from about −10° C., or slightly lower, to about 120° C., or slightly higher, accompanied by heating or cooling, as needed to maintain the temperature at the desired level. The reaction period to be employed will depend upon a variety of factors, such as the nature of the monomer(s), catalyst and/or diluent, the reaction temperature, etc., and can vary over a wide range. For instance, a suitable reaction period generally lies in the range of from about 1 to about 200 hours, but is not necessarily limited thereto. In addition, the polymerization can be carried out under atmospheric, superatmospheric or subatmospheric pressures, as desired.

Upon completion of the polymerization reaction, the polymer product can be recovered in any convenient manner, such as by coagulation, filtration, centrifugation, etc. The reaction product can also be employed directly in many uses for the polymer product, obviating the recovery of the polymer per se.

In an alternative manner to the polymerization technique described above, the alkylation of the thio-ether producing the sulfine, and the polymerization of the monomer(s) can be carried out in one operation by incorporating the alkylating agent in a polymerization reaction mixture containing, as the polymerizable monomer(s), the thio-ether alone, or in admixture with at least one other member of the group of comonomers specifically defined above. In such a procedure, it is to be noted, the alkylating agent should be employed in a mole ratio of at least about 0.05:1, preferably at least about 0.1:1, and more preferably at least about 0.25:1, up to about 5:1, or higher, with regard to the thio-ether. Moreover, when another comonomer is present, the alpha-ethylenically unsaturated thio-ether should be employed in an amount sufficient to provide upon alkylation and polymerization, on a theoretical monomer basis, at least about 5 mole percent, preferably at least about 10 mole percent, and more preferably at least about 25 mole percent of a polymerized sulfine, based upon the total amount of polymerized monomers present in the resulting polymer. Such amount is readily determinable by one skilled in the art in light of this disclosure. The polymerization reaction and the recovery of the resulting polymer, when desired, is carried out as otherwise described above.

The polymeric treating agents of this invention can also be prepared by reacting the alkylating agent with an initially formed polymer, i.e., either a homopolymer of the thio-ether, or a copolymer thereof with another alpha-ethylenically unsaturated comonomer as specifically defined above, the alkylation and initial polymerization reactions being carried out as otherwise described above. In such a procedure, the alkylation is preferably carried out in solution, suitable solvents being the same as those described above in connection with the polymerization reaction. The resulting polymer product can thereafter be recovered, when desired, by coagulation, filtration, centrifugation, or in any other convenient manner.

The polymers produced as described above find utility in a wide variety of applications. They can, for example, be used to produce films suitable for use as packaging and coatings. In addition, aqueous solutions of the polymers can be employed to treat paper in accordance with this invention.

The aqueous treating solutions can be prepared in any convenient manner. They can be obtained, for instance, by dissolving the polymer in water or by introducing additional water to the aqueous solutions of the polymer prepared as described above using water as the polymerization medium. The amount of water employed can vary broadly, but is preferably sufficient to provide solutions containing from about 5 to about 10 weight percent of the polymeric treating agent particularly when the treating solution is employed as a "tub-size." However, more dilute or more concentrated solutions can also be employed to treat paper in accordance with this invention. Moreover, the polymeric treating agents of this invention can also be introduced in solid form to the aqueous media conventionally encountered in connection with the manufacture of paper.

Advantageously, the polymeric treating agents of this invention can be employed effectively in a basic, neutral, or acidic environment or medium, with use in acidic or less alkaline media affording better results, measurable in terms of both the strength of the resulting treated paper products and the temperature and time required to cure the paper in order to develop maximum strength while use in alkaline media is preferred when an improvement in filler retention is of prime importance. Thus, while the pH can vary, generally, from about 1 to about 10, particularly good results have been obtained using media having a pH of from about 4 to about 7, in developing wet- and dry-strength, the more acidic media being somewhat less desirable for use in conventional paper-making equipment, while the use of media having a pH of from about 6 to about 9 is preferred in connection with improving filler retention. The pH can be adjusted to within the desired range by the suitable addition of acid or base to the medium.

In producing the paper products of this invention, the polymeric treating agents can be employed at either the beater, or "wet-end," stage by introducing the polymers to the aqueous paper-making furnish at any time prior to sheet formation, or applied as a "tub-size." The resulting paper product incorporating one or more of the polymers is then dried, and preferably cured by heating at a moderate temperature for a short period of time. To this end, a curing period of from about 3 to about 10 minutes at a temperature in the range of from 75° C. to about 150° C. affords particularly good results. Curing at higher temperatures or for longer periods of time can, of course, also be effected, although little additional advantage may thereby be realized insofar as the strength of the paper is concerned. Satisfactory strength is also developed by drying at room temperature for periods of up to about 24 hours or less. The actual time and temperature required to dry or cure the treated paper will depend, for example, upon the amount of polymer and/or solution contained by the paper. Under any circumstance, good results advantageously can be obtained by drying the treated paper at the temperature and for the periods of time employed in accordance with the conventional manufacture of paper products.

When employing the polymeric treating agents of this invention at the "wet-end" stage, one or more of the polymers, preferably in aqueous solution, is added to the paper furnish at any suitable time prior to sheeting. For example, the adduct can be introduced prior to, during or after beating. Thus, the adduct can be added in the beater, in the Jordan, in the fan pump, or in the headbox, etc. A proportion of from about 0.1 to about 10 weight percent or more of the polymer based upon the weight of the paper fibers has been found to afford good results, with a proportion of from about 0.5 to about 3 weight percent of the polymer based upon the weight of the paper fibers being preferred. Higher proportions of polymer can also be employed, although little additional advantage may thereby be realized insofar as the strength of the paper is concerned.

Thereafter, the treated paper fibers can be sheeted, dried, and preferably cured in conventional manner as indicated above to produce the improved paper products of this invention. Operations associated with conventional paper manufacture, it is to be noted, are well suited for use in this regard.

When employing the polymeric treating agents of this invention as a "tub-size," sheeted paper is dipped, rolled, or padded, etc., with an aqueous solution of one or more of the polymers. The pH of the treating solution is subject to the same considerations described above with respect to pH, as is the proportion of polymer to paper. The latter can be controlled, for instance, by adjusting the amount of solution applied to or picked up by the paper, by adjusting the concentration of polymer in the treating solution, or both, as is readily determined by one skilled in the art in light of this disclosure. The paper product is then dried and preferably cured as hereinabove described.

Conventional fillers can also be employed at the "wet-end" stage, and when present, are retained to an enhanced extent due to the use of the polymeric treating agents of this invention. Suitable fillers include, for instance, clay, calcium carbonate, titanium dioxide, talc, calcium silicate, barium sulfate, and the like. Such fillers can be employed in a proportion of from about 0.5 to about 40 percent by weight, and preferably from about 20 to about 25 percent by weight, based upon the weight of the paper fibers. In addition, when filler retention is of primary importance, lesser amounts of the polymer can be employed. Good results can be obtained under such circumstances, for instance, using from about 0.01 to about 1 percent by weight, and preferably from about 0.1 to about 0.5 percent by weight of the polymer based upon the weight of the paper fibers.

Any suitable pulp can be used in forming the improved paper products of this invention, including bleached and unbleached pulp. Suitable pulp includes sulfite, kraft, soda, groundwood, rag, rope, and jute pulp, etc. The pulp can also contain a minor amount of conventional, synthetic paper-making fibers. Moreover, when it is desired to treat finished paper in accordance with this invention, the paper can be formed in any conventional manner, such as with a Fourdrinier or a cylinder machine.

The improved paper products of this invention can subsequently be employed as packaging, paper bags, bond and envelope papers, paper board, or wherever paper having a high degree of dry- and/or wet-strength, or a high filler content, finds suitable application.

The invention can be illustrated further by the following specific examples, although the invention is not to be construed as limited by the examples. In connection therewith, and with the remainder of the specification and claims, the following definitions are made.

By the term "reduced viscosity" as employed herein is meant the value obtained by dividing the specific viscosity of a polymer solution by the concentration of the polymer in the solution, the concentration being calculated in grams of polymer per 100 milliliters of solvent at a given temperature. The specific viscosity of the polymer solution is obtained by dividing the difference between the viscosity of the polymer solution and the viscosity of the solvent by the viscosity of the solvent. The reduced viscosity of a polymer is taken as a measure of the molecular weight of the polymer, with a higher reduced viscosity indicating a higher molecular weight polymer. Conversely a lower reduced viscosity indicates a lower molecular weight polymer. In all cases, the reduced viscosity values set forth herein were determined at a concentration of 0.2 gram of polymer per 100 milliliters of solvent and at a temperature of 30° C., using a 0.5 molar aqueous sodium acetate solution as the solvent, unless otherwise specifically mentioned. As so measured, the polymeric treating agents of this invention generally have a reduced viscosity of from about 0.5 to about 5, and most frequently from about 2 to about 4.

The terms "basis weight," "ream," "tensile strength," "dry strength," "wet strength," and "bursting strength" are well known in the paper art, and are employed herein in accordance with conventional meanings, a brief description of which is given below.

The common unit for expressing the weight of paper is the number of pounds of paper per ream. Basis weight is the term used in the paper art to refer to the weight in pounds of a ream containing a certain number of sheets cut to a given size. Basis weights mentioned herein are in terms of a standard ream containing 500 sheets, each sheet being 25 x 40 inches. From the weight of any given area of paper, the basis weight is readily calculated.

Tensile strengths, both wet and dry, were measured on a table model Instron tensile tester. In this connection, tensile strength is defined as the force required to break a strip of paper having a standard width of 15 millimeters. Dry- and wet tensile strengths are reported in kilograms/15 millimeters. Percent wet tensile strength refers to that percentage of the dry tensile strength which is retained upon wetting the sheet, and is obtained by dividing the wet tensile strength by the dry tensile strength and multiplying by one hundred. The initial wet tensile strength is determined immediately after wetting the specimen with water; the "16-hour" wet tensile strength is determined after soaking the specimen in water at a temperature of 23° C. for a period of 16 hours.

Bursting strength is an empirical test, and is defined as the hydrostatic pressure required to rupture paper when deformed in an approximate sphere 1.20 inches in diameter at a controlled rate of loading. A B. F. Perkins Model C Mullen bursting strength tester was used to measure the bursting strength of the paper products of this invention. Bursting strengths are reported as points per 100 lbs. This number is obtained by dividing the bursting strength recorded on the pressure gauge of the tester in pounds per square inch by the basis weight of the paper, and multiplying by one hundred.

EXAMPLE I

A Pyrex pressure bottle was charged with 17.2 grams of poly(2-methylthioethyl acrylate), having a reduced viscosity of 1.7, 50 grams of acetonitrile and 50 grams of acetone, capped and tumbled in a constant temperature rotary water bath maintained at a temperature of 50° C. until a homogeneous solution was obtained. The solution was divided into three equal portions, which were placed in three similar pressure bottles (A, B and C). To bottle A there were added 4.95 grams of dimethyl sulfate; to bottle B there were added 3.75 grams of dimethyl sulfate; and to bottle C there were added 2.5 grams of dimethyl sulfate. Each of the bottles was then capped and heated in a water bath maintained at a temperature of 50° C. for a period of 16 hours. The resulting polymer products formed in each of the bottles separated from solution, and were redissolved by the addition of 50 milliliters of water to each bottle. The polymer products were then coagulated in and washed with acetone, and subsequently dried at a temperature of 50° C. in an air-circulating oven. There were thus obtained from bottle A, 9.9 grams of essentially poly(2-acryloxyethyldimethylsulfonium methylsulfate), hereinafter referred to as polymer A; from bottle B, 8.3 grams of a polymer comprised of approximately 75 mole percent of polymerized 2-acryloxyethyldimethylsulfonium methylsulfate and 25 mole percent of polymerized 2-methylthioethyl acrylate, on a theoretical monomer basis, hereinafter referred to as polymer B; and from bottle C, 5.8 grams of a polymer comprised of approximately 50 mole percent of polymerized (2-acryloxyethyl)dimethylsulfonium methylsulfate and 50 mole percent of polymerized 2-methylthioethyl acrylate, on a theoretical monomer basis, hereinafter referred to as polymer C.

EXAMPLE II

A Pyrex polymerization bottle was charged with 10 grams of 2-methylthioethyl acrylate, 10 grams of vinyl acetate, 0.2 gram of azo-2,2'-diisobutyronitrile, and 50 grams of acetonitrile. The bottle was purged with nitrogen, capped, and tumbled in a constant temperature rotary water bath maintained at a temperature of 50° C. for a period of 20 hours. In this manner, a copolymer comprised of approximately 35 mole percent of polymerized 2-methylthioethyl acrylate and 65 mole percent of polymerized vinyl acetate was obtained in acetonitrile solution. To this solution, 8.8 grams of dimethyl sulfate were then added. The amount of dimethyl sulfate employed was sufficient to convert essentially all of the polymerized 2-methylthioethyl acrylate units to the corresponding polymerized form of (2-acryloxyethyl)dimethylsulfonium methylsulfate, so that a polymer comprised of approximately 35 mole percent of polymerized (2-acryloxyethyl)dimethylsulfonium methylsulfate and 65 mole percent of polymerized vinyl acetate was obtained in acetonitrile solution. The polymer was subsequently coagulated in isopropyl ether, filtered and dried in a forced air oven to yield, upon recovery, 26.4 grams of products having a reduced viscosity of 0.5.

EXAMPLE III

In similar manner to that described above in Example II, 10 grams of 2-methylthioethyl acrylate were polymerized with 10 grams of N-methyl-N-vinylacetamide and the resulting copolymer reacted with 8.8 grams of dimethyl sulfate to yield, upon recovery, 26.8 grams of a polymer comprised of approximately 45 mole percent of polymerized (2-acryloxyethyl)dimethylsulfonium methylsulfate and 55 mole percent of polymerized N-methyl-N-vinylacetamide, and having a reduced viscosity of 1.8.

EXAMPLE IV

In similar manner to that described above in Example II, 10 grams of 2-methylthioethyl acrylate were polymerized with 10 grams of N-vinyl-2-pyrrolidone and the resulting copolymer reacted with 8.8 grams of dimethyl sulfate to yield, upon recovery, 28.8 grams of a polymer comprised of approximately 45 mole percent of polymerized (2-acryloxyethyl)dimethylsulfonium methylsulfate and 55 mole percent of polymerized N-vinyl-2-pyrrolidone, and having a reduced viscosity of 1.7.

EXAMPLE V

In similar manner to that described above in Example II, 10 grams of 2-methylthioethyl acrylate were polymerized with 10 grams of ethyl acrylate and the resulting copolymer reacted with 8.8 grams of dimethylsulfate to yield, upon recovery, 25.6 grams of a polymer comprised of approximately 45 mole percent of polymerized (2-acryloxyethyl)dimethyl sulfonium methylsulfate and 55 mole percent of polymerized ethyl acrylate, and having a reduced viscosity of 3.0.

EXAMPLE VI

In similar manner to that described above in Example II, except where otherwise indicated, 10 grams of 2-methylthioethyl acrylate were polymerized with 10 grams of 2-cyanoethyl acrylate and the resulting copolymer reacted with 8.8 grams of dimethyl sulfate to yield, upon dissolution in water, precipitation in acetone, filtration and drying, 21.0 grams of a polymer comprised of approximately 50 mole percent of polymerized (2-acryloxyethyl)dimethylsulfonium methylsulfate and 50 mole percent of polymerized 2-cyanoethyl acrylate, and having a reduced viscosity of 0.8.

EXAMPLE VII

In similar manner to that described above in Example II, except where otherwise indicated, 3 grams of 2-methylthioethyl acrylate were polymerized with 7 grams of acrylamide in 100 grams of acetonitrile and the resulting copolymer, obtained as a suspension in acetonitrile was reacted with 2 grams of dimethyl sulfate to yield, upon recovery, 11.6 grams of a polymer comprised of approximately 15 mole percent of polymerized (2-acryloxyethyl)dimethylsulfonium methylsulfate, 80 mole percent of polymerized acrylamide, and 5 mole percent of polymerized 2-methylthioethyl acrylate.

EXAMPLE VIII

In similar manner to that described above in Example II, 4 grams of 2-methylthioethyl acrylate were polymerized with 6 grams of acrylamide and essentially all of the resulting copolymer reacted with 3.5 grams of dimethyl sulfate to yield, upon recovery, a polymer comprised of approximately 25 mole percent of polymerized (2-acryloxyethyl)-dimethylsulfonium methylsulfate and 75 mole percent of polymerized acrylamide, and having a reduced viscosity of 0.6.

EXAMPLE IX

In a manner similar to that described above in Example II, except where otherwise indicated, 5 grams of 2-cyanoethyl acrylate were polymerized with 5 grams of (2-acryloxyethyl)dimethylsulfonium methylsulfate in 50 grams of N,N-dimethylformamide. The resulting product was coagulated in diethylene glycol diethyl ether, washed with heptane, filtered, and dried to yield 8 grams of a copolymer comprised of approximately 40 mole percent of polymerized (2-acryloxyethyl)dimethylsulfonium methylsulfate and 60 mole percent of polymerized 2-cyanoethyl acrylate, and having a reduced viscosity of 0.9 in water. This sulfine employed in this example was initially obtained by a reaction of 2-methylthioethyl acrylate with dimethylsulfate in accordance with conventional reactions between a thio-ether and an alkylating agent, as hereinabove described.

EXAMPLE X

In a manner similar to that described above in Example II, except where otherwise indicated, 25 grams of (2-acryloxyethyl)dimethylsulfonium methylsulfate were polymerized with 25 grams of acrylamide in 120 grams of acetonitrile to yield, upon recovery, 50 grams of a polymer comprised of approximately 20 mole percent of polymerized (2-acryloxyethyl)dimethylsulfonium methylsulfate and 80 mole percent of polymerized acrylamide, and having a reduced viscosity of 1.0. The sulfine employed in this example was initially obtained as described above in Example IX. For subsequent use, the copolymer was blended with a (20:80 mole percent) (2-acryloxyethyl)dimethylsulfonium methylsulfate-acrylamide copolymer obtained in like manner to that described above in this example, the reduced viscosity of the blend being 0.2.

EXAMPLE XI

In a manner similar to that described above in Example II, 80 grams of 2-ethylhexyl acrylate were polymerized with 10.75 grams of 2-methylthioethyl acrylate in 67 grams of isopropanol and the resulting copolymer reacted with 9.3 grams of dimethyl sulfate to yield, upon recovery a copolymer comprised of approximately 15 mole percent of polymerized (2-acryloxyethyl)dimethyl-sulfonium methylsulfate and 85 mole percent of polymerized 2-ethylhexyl acrylate.

EXAMPLE XII

In a manner similar to that described above in Example II, 30 grams of vinylbenzene and 30 grams of ethyl acrylate were polymerized with 16.1 grams of 2-methylthioethyl acrylate in 51 grams of acetonitrile and the resulting terpolymer reacted with 13 grams of dimethyl sulfate to yield, upon recorvery, a terpolymer comprised of approximately 15 mole percent of polymerized (2-acryloxyethyl)dimethyl sulfonium methyl sulfate, 40 mole percent of polymerized vinylbenzene and 45 mole percent of polymerized ethyl acrylate.

EXAMPLE XIII

In a manner similar to that described above 80 grams of vinylbenzene were polymerized with 10.75 grams of 2-methylthioethyl acrylate in 25 grams of acetonitrile and the resulting copolymer reacted with 9 grams of dimethyl sulfate to yield, upon recovery, a copolymer comprised of approximately 10 mole percent of polymerized (2-acryloxyethyl)dimethylsulfonium methylsulfate and 90 mole percent of polymerized vinylbenzene.

EXAMPLE XIV

In this series of experiments, 400 grams of unbleached kraft pulp, which had initially been soaked in water for a period of four hours, was beaten at a consistency of 1.7 percent in a Valley 1.5 pound beater in accordance with TAPPI standard T-200M-60 to a Canadian Standard Freeness of 500 (TAPPI standard T-227M-58) and then disintegrated in a TAPPI standard disintegrator. Thereafter, 2-liter aliquots of the beaten pulp containing 30 grams of pulp fibers were admixed for a period of 5 minutes in the disintegrator with an aqueous solution of various polymeric treating agents of this invention in an amount sufficient to provide 3 percent by weight of the polymer based upon the weight of the pulp fibers. Handsheets were prepared therefrom on a Noble and Wood handsheet machine according to directions supplied by the manufacturer. The resulting handsheets were then dried for a period of 3 minutes at a temperature of 100° C. After conditioning the treated papers according to TAPPI standard T-402M-49, the physical properties of the treated papers were determined, the results of which are set forth below in Tables A and B. Experiments were also conducted for comparison purposes, in one instance using no treating agent (control) and in two other instances using equal weights of commercially available polyacrylamide polymer, identified in the tables as (200) and (2610). The polymeric treating agents of this invention are identified in the tables by the corresponding numbers of the examples, above, which describe their preparation.

Upon evaluation in similar manner to that described above in this example, the polymers of Examples XI, XII and XIII resulted in percent wet tensiles of 8, 18, and 8 respectively.

EXAMPLE XV

A series of experiments were conducted in a manner similar to that described above in Example XIV. In this series of experiments, however, the pH of the papermaking furnish was adjusted by the addition of hydrochloric acid or sodium hydroxide, and the drying time and temperature varied. The results are tabulated below in Table C.

In similar manner, paper products evidencing a high degree of wet strength were obtained independently employing the polymeric treating agents prepared as described above in Examples VIII to X. In addition, paper products evidencing a high degree of wet strength were obtained from unbleached kraft pulp and from bleached aspen pulp using a copolymer comprised of approximately 10 mole percent of polymerized (2-acryloxyethyl) dimethylsulfonium methylsulfate and 90 mole percent of polymerized acrylamide as the polymeric treating agent.

EXAMPLE XVI

In this series of experiments, aqueous solutions were prepared, each containing 2 percent by weight of a polymeric treating agent of this invention. Samples of bleached sulfite paper were then independently saturated in a polymer solution, passed through squeeze rolls, and dried and conditioned as described above in Example XIV. By way of comparison, experiments were also conducted in one instance using no treating agent (control) and in another instance, using starch as the treating agent. Thereafter, the physical properties of the treated papers were determined, the results of which are set forth below in Table D. In the table, the "add-on" is the amount of polymer picked up by the paper, and is indicated in percent by weight thereof, based upon the weight of the dry paper.

*Table D*

| Treating Agent | Add On | Bursting Strength | Percent Increase | Dry Tensile Strength | Percent Increase | Wet Tensile Strength | Percent Wet Tensile |
|---|---|---|---|---|---|---|---|
| Ex. IX | 1 | 27.0 | | 4.2 | | 0.85 | 20 |
| Ex. X | 1 | 36.6 | 39 | 5.1 | 21 | 1.4 | 28 |
| Starch | 4 | 45.0 | 70 | 6.8 | 62 | | |
| Control | | 26.4 | | 4.2 | | 0.08 | 2.2 |

EXAMPLE XVII

In this series of experiments, 400 grams of bleached sulfite pulp were initially beaten and disintegrated as described above in Example XIV. Two-quart aliquots of the beaten pulp were thereafter admixed for a period of 5 minutes in the disintegrator with 3 grams of filler, and with a 2 percent aqueous solution of a polymeric treating agent of this invention, in an amount containing 0.3 gram of polymer, i.e., sufficient to provide 1 percent by weight of the polymer based upon the weight of the pulp fibers; the pH was adjusted by addition of hydrochloric acid or sodium hydroxide. Handsheets were then pre-

*Table A*

| Treating Agent | Dry Tensile Strength | Percent Increase | Wet Tensile Strength | Percent Wet Tensile |
|---|---|---|---|---|
| Ex. IA | 7.5 | 34 | 0.60 | 8.0 |
| Ex. IB | 6.2 | 11 | 0.34 | 5.5 |
| Ex. IC | 6.5 | 16 | 0.26 | 4.0 |
| (2610) | 6.3 | 12 | 0.17 | 2.7 |
| (200) | 6.3 | 12 | 0.12 | 1.9 |
| Control | 5.6 | | 0.12 | 2.0 |

*Table B*

| Treating Agent | Dry Tensile Strength | Percent Increase | Wet Tensile Strength | Percent Wet Tensile | Bursting Strength | Percent Increase |
|---|---|---|---|---|---|---|
| Ex. II | 6.9 | 28 | 0.38 | 5.5 | 93 | 26 |
| Ex. III | 6.1 | 13 | 0.08 | 1.3 | 88 | 19 |
| Ex. IV | 6.3 | 15 | 0.06 | 1.0 | 90 | 22 |
| Ex. V | 5.9 | 9.3 | 0.51 | 8.7 | 71 | |
| Ex. VI | 6.4 | 18 | 0.29 | 4.5 | 88 | 19 |
| Ex. VII | 6.3 | 15 | 0.27 | 4.2 | 97 | 26 |
| Control | 5.4 | | 0.04 | 1 | 74 | |

*Table C*

| Treating Agent | pH | Drying Time (mins.) | Drying Temp. (° C.) | Dry Tensile Strength | Percent Increase | Wet Tensile Strength | Percent Wet Tensile |
|---|---|---|---|---|---|---|---|
| Ex. IA | 4.5 | 3 | 110 | 6.9 | 21 | 0.35 | 5.1 |
| Ex. IA | 4.5 | 10 | 150 | 6.9 | 27 | 1.70 | 25.0 |
| Ex. IA | 7.0 | 3 | 110 | 7.5 | 27 | 0.60 | 8.0 |
| Ex. IC | 4.5 | 3 | 110 | 5.3 | | 0.18 | 3.4 |
| Ex. IC | 4.5 | 10 | 150 | 6.9 | 21 | 1.60 | 23.0 |
| Ex. IC | 7.0 | 3 | 110 | 6.5 | 16 | 0.26 | 4.0 |
| Control | 4.5 | 3 | 110 | 5.6 | | 0.12 | 2.0 |
| Control | 7.0 | 10 | 150 | 5.7 | | 0.41 | 7.2 | pared as described above in Example XIV. The amount of filler retained by the treated papers was determined by conventional ash analysis, and the results obtained are tabulated below in Table E.

Table E

| Treating Agent | Filler Used | pH | Percent Ash | Percent Retention | Percent Increase |
|---|---|---|---|---|---|
| Ex. X | Clay | 6.7 | 5.18 | 52 | 330 |
| Ex. VIII | do | 6.7 | 4.74 | 48 | 300 |
| Ex. IX | do | 6.7 | 2.78 | 28 | 133 |
| Control | do | 6.7 | 1.19 | 12 | |
| Ex. IX | TiO$_2$ | 4.5 | 4.46 | 45 | 25 |
| Control | TiO$_2$ | 4.5 | 3.56 | 36 | |
| Ex. X | CaCO$_3$ | 8.5 | 6.53 | 66 | 175 |
| Ex. VIII | CaCO$_3$ | 8.5 | 5.75 | 58 | 150 |
| Ex. IX | CaCO$_3$ | 8.5 | 2.96 | 30 | 25 |
| Control | CaCO$_3$ | 8.5 | 2.48 | 24 | |

EXAMPLE XVIII

This series of experiments was conducted in a manner similar to that described above in Example XVII using 10 percent by weight of calcium carbonate based upon the weight of the sulfite pulp as a filler, and using 0.05 percent by weight of the polymeric treating agent of this invention. The polymers employed in this series of experiments were, in all instances but one, copolymers of (2-acryloxyethyl)dimethylsulfonium methylsulfate and acrylamide, and are identified below in Table F by their polymerized sulfine content in mole percent. Thus, polymer 10 is comprised of approximately 10 mole percent of the sulfine. In addition, one homopolymer of the sulfine was employed, identified as polymer 100.

Table F

| Treating Agent | pH | Percent Ash | Percent Retention |
|---|---|---|---|
| Control | 8.4 | 1.8 | 32 |
| Polymer 10 | 8.6 | 3.1 | 55 |
| Polymer 15 | 8.6 | 3.2 | 57 |
| Polymer 25 | 8.3 | 3.7 | 66 |
| Polymer 50 | 8.4 | 3.4 | 61 |
| Polymer 100 | 8.5 | 2.8 | 50 |

EXAMPLE XIX

In a manner similar to that described above in Example XIV, two copolymers of (2-acryloxyethyl)dimethylsulfonium methylsulfate with ethyl acrylate and with vinylbenzene, one containing 10 mole percent of polymerized (2-acryloxyethyl)dimethylsulfonium methylsulfate and 90 mole percent of polymerized ethyl acrylate, identified below as XIXA, the other containing 35 mole percent of polymerized (2-acryloxyethyl)dimethylsulfonium methylsulfate and 65 mole percent of vinylbenzene, identified below as XIXB, were evaluated as treating agents for paper products. The results obtained are tabulated below in Table G.

Table G

| Treating Agent | Add on | pH [1] | Dry Tensile strength | Wet Tensile strength | Percent Wet Tensile |
|---|---|---|---|---|---|
| XIXA | 1 | 6.3 | 6.4 | 0.74 | 12 |
| XIXA | 5 | 6.5 | 5.8 | 1.06 | 18 |
| XIXB | 3 | [2] 8.4 | 5.8 | 1.37 | 24 |
| XIXB | 3 | 8.4 | 6.6 | 1.53 | 23 |
| XIXB | 3 | 7.4 | 5.8 | 1.40 | 24 |

[1] At the deckle-box.
[2] Polymer solution adjusted to pH of 5 with triethanolamine prior to introduction to pulp slurry.

By comparison of the data obtained in Examples XIV to XIX, particularly in view of the control experiments, the improvement in paper products achieved through the practice of this invention is readily apparent.

In addition to the foregoing, it has also been found that improved latex-treated paper products can be obtained by incorporating a polymeric treating agent of this invention with a conventional vinyl latex during the preparation of the paper products, particularly at the wet-end stage, although not necessarily limited thereto. The paper products thus obtained are superior in many respects to those obtained independently using the latex or the polymeric treating agent of this invention.

What is claimed is:

1. A paper product comprised of cellulosic papermaking fibers and incorporating from about 0.1 to about 10 weight percent based upon said fibers of a normally solid water soluble polymer selected from the group consisting of (a) homopolymers of an alpha-ethylenically unsaturated sulfine of the formula:

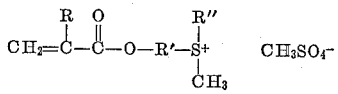

wherein R is selected from the group consisting of hydrogen and the methyl radical, R' is an alkylene radical of from 1 to 4 carbon atoms, and R" is an alkyl radical of from 1 to 4 carbon atoms, and (b) interpolymers of said sulfine with at least one copolymerizable monomer selected from the group consisting of (i) the alkylthioalkyl-acrylates and methacrylates of the formula:

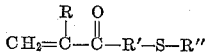

wherein R, R' and R" are as defined above, (ii) acrylamide and methacrylamide, (iii) the alkyl and cyano-alkyl acrylates and methacrylates of the formula:

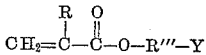

wherein R is as defined above, R" is an alkylene radical of from 1 to 10 carbon atoms, and Y is selected from the group consisting of hydrogen and the cyano radical, (iv) the vinyl alkanoates of the formula:

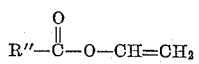

wherein R" is as defined above, (v) the N-alkyl-N-vinyl-amides of the formula:

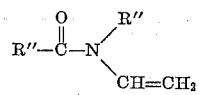

wherein each R" is independently selected as defined above, (vi) N-vinylpyrrolidone and (vii) vinylbenzene; said interpolymers containing in polymerized form at least 5 mole percent of said alpha-ethylenically unsaturated sulfine.

2. A paper product comprised of cellulose papermaking fibers and incorporating from about 0.5 to about 3 weight percent based upon said fibers of a normally solid water soluble polymer selected from the group consisting of (a) homopolymers of an alpha-ethylenically unsaturated sulfine of the formula:

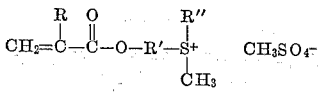

wherein R is selected from the group consisting of hydrogen and the methyl radical, R' is an alkylene radical of from 1 to 4 carbon atoms, and R" is an alkyl radical of from 1 to 4 carbon atoms, and (b) interpolymers of said sulfine with at least one copolymerizable monomer selected from the group consisting of (i) the alkylthioalkyl-acrylates and methacrylates of the formula:

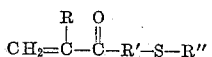

wherein R, R' and R" are as defined above, (ii) acrylamide and methacrylamide, (iii) the alkyl and cyanoalkyl acrylates and methacrylates of the formula:

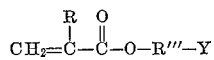

wherein R is as defined above, R''' is an alkylene radical of from 1 to 10 carbon atoms, and Y is selected from the group consisting of hydrogen and the cyano radical, (iv) the vinyl alkanoates of the formula:

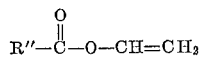

wherein R'' is as defined above, (v) the N-alkyl-N-vinylamides of the formula:

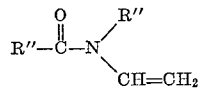

wherein each R'' is independently selected as defined above, (vi) N-vinylpyrrolidone, and (vii) vinylbenzene; said interpolymers containing in polymerized form from about 10 to about 99 mole percent of said alpha-ethylenically unsaturated sulfine.

3. A paper product comprised of cellulosic papermaking fibers and incorporating from about 0.5 to about 3 weight percent based upon said fibers of a normally solid water soluble homopolymer of (2-acryloxymethyl)dimethylsulfonium methylsulfate.

4. A paper product comprised of cellulosic papermaking fibers and incorporating from about 0.5 to about 3 weight percent based upon said fibers of a normally solid water soluble copolymer of (2-acryloxyethyl)dimethylsulfonium methylsulfate and 2-cyanoethyl acrylate, said copolymer containing in polymerized form from about 25 to about 80 mole percent of said (2-acryloxyethyl)dimethylsulfonium methylsulfate.

5. A paper product comprised of cellulosic papermaking fibers and incorporating from about 0.5 to about 3 weight percent based upon said fibers of a normally solid water soluble copolymer of (2-acryloxyethyl)dimethylsulfonium methylsulfate and vinyl acetate, said copolymer containing in polymerized form from about 25 to about 80 mole percent of said (2-acryloxyethyl)dimethylsulfonium methylsulfate.

6. A paper product comprised of cellulosic papermaking fibers and incorporating from about 0.5 to about 3 weight percent based upon said fibers of a normally solid water soluble copolymer of (2-acryloxyethyl)dimethylsulfonium methylsulfate and acrylamide, said copolymer containing in polymerized form from about 25 to about 80 mole percent of said (2-acryloxyethyl)dimethylsulfonium methylsulfate.

7. In the manufacture of paper products from cellulosic paper-making fibers, the improvement which comprises applying to said fibers in aqueous solution from about 0.1 to about 10 weight percent based upon said fibers of a normally solid water soluble polymer selected from the group consisting of (a) homopolymers of an alpha-ethylenically unsaturated sulfine of the formula:

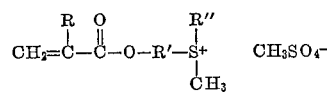

wherein R is selected from the group consisting of hydrogen and the methyl radical, R' is an alkylene radical of from 1 to 4 carbon atoms, and R'' is an alkyl radical of from 1 to 4 carbon atoms, and (b) interpolymers of said sulfine with at least one copolymerizable monomer selected from the group consisting of (i) the alkylthioalkylacrylates and methacrylates of the formula:

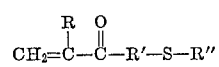

wherein R, R' and R'' are as defined above, (ii) acrylamide and methacrylamide, (iii) the alkyl and cyanoalkyl acrylates and methacrylates of the formula:

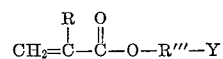

wherein R is as defined above, R''' is an alkylene radical of from 1 to 10 carbon atoms, and Y is selected from the group consisting of hydrogen and the cyano radical, (iv) the vinyl alkanoates of the formula:

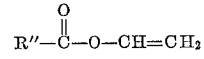

wherein R'' is as defined above, (v) the N-alkyl-N-vinylamides of the formula:

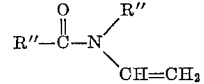

wherein each R'' is independently selected as defined above, (vi) N-vinylpyrrolidone, and (vii) vinylbenzene; said interpolymers containing in polymerized form at least 5 mole percent of said alpha-ethylenically unsaturated sulfine.

8. In the manufacture of paper products from cellulosic paper-making fibers, the improvement which comprises applying to said fibers in aqueous solution from about 0.5 to about 3 weight percent based upon said fibers of a normally solid water soluble polymer selected from the group consisting of (a) homopolymers of an alpha-ethylenically unsaturated sulfine of the formula:

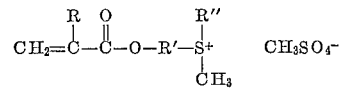

wherein R is selected from the group consisting of hydrogen and the methyl radical, R' is an alkylene radical of from 1 to 4 carbon atoms, and R'' is an alkyl radical of from 1 to 4 carbon atoms, and (b) interpolymers of said sulfine with at least one copolymerizable monomer selected from the group consisting of (i) the alkylthioalkylacrylates and methacrylates of the formula:

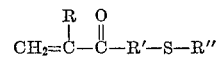

wherein R, R' and R'' are as defined above, (ii) acrylamide and methacrylamide, (iii) the alkyl and cyanoalkyl acrylates and methacrylates of the formula:

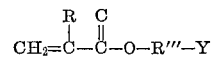

wherein R is as defined above, R''' is an alkylene radical of from 1 to 10 carbon atoms and Y is selected from the group consisting of hydrogen and the cyano radical, (iv) the vinyl alkanoates of the formula:

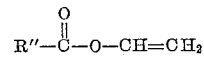

wherein R'' is as defined above, (v) the N-alkyl-N-vinylamides of the formula:

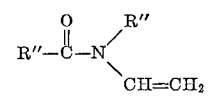

wherein each R'' is independently selected as defined above, (vi) N-vinylpyrrolidone, and (vii) vinylbenzene; said interpolymers containing in polymerized form from about 10 to about 99 mole percent of said alpha-ethylenically unsaturated sulfine.

9. In the manufacture of paper products from cellulosic paper-making fibers, the improvement which comprises applying to said fibers in aqueous solution from about 0.5 to about 3 weight percent based upon said fibers of a normally solid water soluble homopolymer of (2-acryloxyethyl)dimethylsulfonium methylsulfate.

10. In the manufacture of paper products from cellulosic paper-making fibers, the improvement which comprises applying to said fibers in aqueous solution from about 0.5 to about 3 weight percent based upon said fibers of a normally solid water soluble copolymer of (2-acryloxyethyl)dimethylsulfonium methylsulfate and 2-methylthioethyl acrylate, said copolymer containing in polymerized form from about 25 to about 80 mole percent of said (2-acryloxyethyl)dimethylsulfonium methylsulfate.

11. In the manufacture of paper products from cellulosic paper-making fibers, the improvement which comprises applying to said fibers in aqueous solution from about 0.5 to about 3 weight percent based upon said fibers of a normally solid water soluble copolymer of (2-acryloxyethyl)dimethylsulfonium methylsulfate and ethyl acrylate, said copolymer containing in polymerized form from about 25 to about 80 mole percent of said (2-acryloxyethyl)dimethylsulfonium methylsulfate.

12. In the manufacture of paper products from cellulosic paper-making fibers, the improvement which comprises applying to said fibers in aqueous solution from about 0.5 to about 3 weight percent based upon said fibers of a normally solid water soluble copolymer of (2-acryloxyethyl)dimethylsulfonium methylsulfate and acrylamide, said copolymer containing in polymerized form from about 25 to about 80 mole percent of said (2-acryloxyethyl)dimethylsulfonium methylsulfate.

13. In the manufacture of paper products from cellulosic paper-making fibers, the improvement which comprises admixing said fibers prior to sheeting with an aqueous medium containing from about 0.5 to about 40 weight percent based upon said fibers of a paper filler and from about 0.01 to about 1 weight percent based upon said fibers of a normally solid water soluble polymer selected from the group consisting of (a) homopolymers of an alpha-ethylenically unsaturated sulfine of the formula:

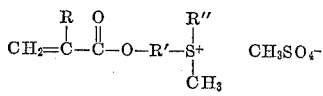

wherein R is selected from the group consisting of hydrogen and the methyl radical, R' is an alkylene radical of from 1 to 4 carbon atoms, and R" is an alkyl radical of from 1 to 4 carbon atoms, and (b) interpolymers of said sulfine with at least one copolymerizable monomer selected from the group consisting of (i) the alkylthioalkylacrylates and methacrylates of the formula:

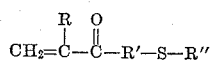

wherein R, R' and R" are as defined above, (ii) acrylamide and methacrylamide, (iii) the alkyl and cyanoalkyl acrylates and methacrylates of the formula:

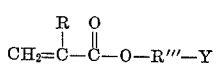

wherein R is as defined above, R" is an alkylene radical of from 1 to 10 carbon atoms, and Y is selected from the group consisting of hydrogen and the cyano radical, (iv) the vinyl alkanoates of the formula:

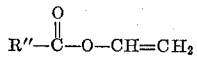

wherein R" is as defined above, (v) the N-alkyl-N-vinylamides of the formula:

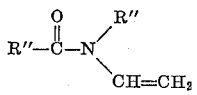

wherein each R" is independently selected as defined above, (vi) N-vinylpyrrolidone, and (vii) vinylbenzene; said interpolymers containing in polymerized form at least 5 mole percent of said alpha-ethylenically unsaturated sulfine.

14. In the manufacture of paper products from cellulosic paper-making fibers, the improvement which comprises admixing said fibers prior to sheeting with an aqueous medium containing from about 2 to about 25 weight percent based upon said fibers of a paper filler and from about 0.1 to about 0.5 weight percent based upon said fibers of a normally solid water soluble homopolymer of (2-acryloxyethyl)dimethylsulfonium methylsulfate.

15. In the manufacture of paper products from cellulosic paper-making fibers, the improvement which comprises admixing said fibers prior to sheeting with an aqueous medium containing from about 2 to about 25 weight percent based upon said fibers of a paper filler and from about 0.1 to about 0.5 weight percent based upon said fibers of a normally solid water soluble copolymer of (2-acryloxyethyl)dimethylsulfonium methylsulfate and 2-cyanoethyl acrylate, said copolymer containing in polymerized form from about 25 to about 80 mole percent of said (2-acryloxyethyl)dimethylsulfonium methylsulfate.

16. In the manufacture of paper products from cellulosic paper-making fibers, the improvement which comprises admixing said fibers prior to sheeting with an aqueous medium containing from about 2 to about 25 weight percent based upon said fibers of a paper filler and from about 0.1 to about 0.5 weight percent based upon said fibers of a normally solid water soluble copolymer of (2-acryloxyethyl)dimethylsulfonium methylsulfate and acrylamide, said copolymer containing in polymerized form from about 25 to about 80 mole percent of said (2-acryloxyethyl)dimethylsulfonium methylsulfate.

References Cited by the Examiner

UNITED STATES PATENTS

| 2,768,990 | 10/56 | Dejong | 260—79 |
| 2,895,925 | 7/59 | Hwa | 260—79 |
| 2,923,700 | 2/60 | Price et al. | 260—79.7 |
| 2,955,067 | 10/60 | McBurney et al. | 162—164 |
| 2,989,520 | 6/61 | Rutenberg et al. | 260—233.3 |
| 3,060,156 | 10/62 | Rassweiler et al. | 260—79.7 |
| 3,078,259 | 2/63 | Hatch et al. | 260—79.7 |

DONALL H. SYLVESTER, *Primary Examiner.*

MORRIS O. WOLK, *Examiner.*

UNITED STATES PATENT OFFICE
CERTIFICATE OF CORRECTION

Patent No. 3,207,656 September 21, 1965

Nelson R. Eldred et al.

It is hereby certified that error appears in the above numbered patent requiring correction and that the said Letters Patent should read as corrected below.

Column 1, line 29, for "wetter" read -- wetted --; column 14, line 35, for "R″" read -- R‴ --; line 54, for "cellulose" read -- cellulosic --; column 15, line 27, for "acryloxymethyl" read -- acryloxyethyl --; column 17, line 61, for "R″ " read -- R‴ --.

Signed and sealed this 19th day of April 1966.

(SEAL)
Attest:

ERNEST W. SWIDER
Attesting Officer

EDWARD J. BRENNER
Commissioner of Patents